(12) United States Patent
Kruempelmann et al.

(10) Patent No.: US 12,430,362 B2
(45) Date of Patent: Sep. 30, 2025

(54) DYNAMIC SELECTION OF DELTA CLIENT COPY STRATEGIES

(71) Applicant: SAP SE, Walldorf (DE)

(72) Inventors: Wulf Kruempelmann, Altlussheim (DE); Dominik Ofenloch, Lampertheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/524,372

(22) Filed: Nov. 30, 2023

(65) Prior Publication Data

US 2025/0181605 A1    Jun. 5, 2025

(51) Int. Cl.
| | |
|---|---|
| G06F 7/00 | (2006.01) |
| G06F 16/22 | (2019.01) |
| G06F 16/23 | (2019.01) |
| G06F 16/27 | (2019.01) |

(52) U.S. Cl.
CPC ........ G06F 16/275 (2019.01); G06F 16/2282 (2019.01); G06F 16/2358 (2019.01)

(58) Field of Classification Search
CPC . G06F 16/275; G06F 16/2282; G06F 16/2358
See application file for complete search history.

(56) References Cited

U.S. PATENT DOCUMENTS

| | | | | |
|---|---|---|---|---|
| 5,634,056 A | * | 5/1997 | Casotto | G06F 16/178 |
| | | | | 707/999.203 |
| 6,516,327 B1 | * | 2/2003 | Zondervan | G06F 16/275 |
| 11,768,855 B1 | * | 9/2023 | Hodavdekar | G06F 16/273 |
| | | | | 707/615 |
| 2005/0044088 A1 | * | 2/2005 | Lindsay | G06F 16/273 |
| 2006/0200533 A1 | * | 9/2006 | Holenstein | G06F 16/273 |
| | | | | 709/208 |
| 2009/0319581 A1 | * | 12/2009 | Seifert | G06F 16/22 |
| 2010/0114831 A1 | * | 5/2010 | Gilbert | G06F 16/27 |
| | | | | 707/648 |
| 2010/0153423 A1 | * | 6/2010 | Lu | G06F 16/2386 |
| | | | | 707/759 |
| 2011/0161289 A1 | * | 6/2011 | Pei | G06F 16/275 |
| | | | | 707/613 |
| 2015/0142749 A1 | * | 5/2015 | Broll | G06F 16/27 |
| | | | | 707/654 |

(Continued)

*Primary Examiner* — Mohammed R Uddin
(74) *Attorney, Agent, or Firm* — Mintz Levin Cohn Ferris Glovsky and Popeo, P.C.

(57) ABSTRACT

Arrangements for dynamic selection of delta client copy strategies are provided. An intelligent client copy computing platform may determine whether a database table of a source client is empty. If not, the copy computing platform may determine whether the database table has changed. If not, the computing platform may determine whether the database table has been copied from a same source client of a last copy operation. If so, the computing platform may determine whether a record count of the source client is the same as the record count of a target client. If not, the computing platform may apply a delta copy algorithm. The algorithm may select records of the source client, deduct records of the target client from those records, insert records that are in the source but not in the target client, and delete records that are in the target but not in the source client.

12 Claims, 4 Drawing Sheets

(56) References Cited

U.S. PATENT DOCUMENTS

| | | | | |
|---|---|---|---|---|
| 2016/0092538 | A1* | 3/2016 | Verma | G06F 16/21 |
| | | | | 707/639 |
| 2019/0018874 | A1* | 1/2019 | Eberlein | G06F 16/215 |
| 2020/0057697 | A1* | 2/2020 | Yeung | G06F 11/1466 |
| 2020/0125657 | A1* | 4/2020 | Thode | G06F 16/2358 |
| 2020/0320059 | A1* | 10/2020 | Kumar | G06F 16/27 |
| 2021/0349916 | A1* | 11/2021 | Ofenloch | G06F 16/284 |
| 2022/0179845 | A1* | 6/2022 | Shats | G06F 16/2379 |
| 2022/0284033 | A1* | 9/2022 | Stolze | G06F 16/27 |
| 2022/0284034 | A1* | 9/2022 | Stolze | G06F 11/3476 |
| 2022/0365696 | A1* | 11/2022 | Hildebrand | G06F 3/0614 |
| 2023/0064907 | A1* | 3/2023 | Lin | G06F 16/22 |
| 2023/0140730 | A1* | 5/2023 | Ofenloch | G06F 16/2433 |
| | | | | 707/610 |
| 2024/0412572 | A1* | 12/2024 | Sequino | G07C 5/0816 |

* cited by examiner

Database_Table_View

| Table Name | Number of Records | Last Update |
|---|---|---|
| Country_Definition | 0 | Yesterday |
| ... | ... | ... |

FIG. 3A

Client_Copy_Log

| Source Client | Target Client | Execution Date |
|---|---|---|
| 100 | 200 | Today |
| ... | ... | ... |

DYNAMIC SELECTION OF DELTA CLIENT COPY STRATEGIES

TECHNICAL FIELD

The subject matter described herein relates generally to data processing and more specifically to a dynamic selection of delta client copy strategies.

BACKGROUND

A client copy tool may be used in different scenarios to copy data from one client to another. For example, the client copy tool may be used for refreshing test systems with production data, building new test clients, checking foreign keys, restoring broken clients, and/or the like. Conventionally, the selection of a copy strategy is applied globally for an entire client copy process and cannot be decided individually for each table. A copy of an entire client may cause over several hundred gigabytes of data to be copied from one client to another. Such a process requires a lot of space and runtime, and it may be difficult to ensure that the copy process is done quickly and with as little disruption to productive operations as possible.

SUMMARY

Methods, systems, and articles of manufacture, including computer program products, are provided for dynamic selection of delta client copy strategies. In one aspect, there is provided a system including at least one processor and at least one memory. The at least one memory can store instructions that cause operations when executed by the at least one processor. The operations may include: determining, based on database statistics, that a database table of a source client is populated, the database statistics may include statistical data collected for the database table; responsive to determining that the database table of the source client is populated, determining, based on the database statistics and a client copy log, that the database table has changed, the database statistics may indicate a last update of a record in the database table, and the client copy log may identify a chronological order of previously executed copy operations; responsive to determining that the database table has changed, determining that the database table has been copied from a same source client of a last client copy operation; responsive to determining that the database table has been copied from the same source client of the last client copy operation, identify a record count in each of the source client and a target client; and responsive to determining that the record count of the source client is different from the record count of the target client, apply a delta copy algorithm. In addition, the delta copy algorithm may include: selecting records of the source client; deducting, from the records of the source client, records of the target client; inserting records that are in the source client and not in the target client; and deleting records that are in the target client and not in the source client.

In some variations, one or more of the features disclosed herein including the following features can optionally be included in any feasible combination. In some variations, the operations may further include: determining, based on the database statistics, that the database table of the source client is empty; and responsive to determining that the database table of the source client is empty, skipping a copy operation on the database table.

In some variations, the operations may further include: determining, based on the database statistics and the client copy log, that the database table is unchanged; and responsive to determining that the database table is unchanged, skipping a copy operation on the database table.

In some variations, the operations may further include: determining that the database table has not been copied from the same source client of the last client copy operation; deleting data of the target client; and after the deleting, copying data of the source client to the database table using an insert operation.

In some variations, the operations may further include: determining that the record count of the source client is the same as the record count of the target client; comparing an intersect of the record count of the source client and the record count of the target client, to the record count in each of the source client and the target client; determining, using the comparing, that data is different in the source client and the target client; and applying the delta copy algorithm, where only changed data records are deleted or copied.

In some variations, the operations may further include: determining that the record count of the source client is the same as the record count of the target client; comparing an intersect of the record count of the source client and the record count of the target client, to the record count in each of the source client and the target client; determining, using the comparing, that data is the same in the source client and the target client; and skipping a copy operation on the database table.

In some variations, the client copy log may further identify the source client and the target client of each copy operation.

In another aspect, there is provided a method for dynamic selection of delta client copy strategies. The method may include: determining, based on database statistics, that a database table of a source client is populated, the database statistics may include statistical data collected for the database table; responsive to determining that the database table of the source client is populated, determining, based on the database statistics and a client copy log, that the database table has changed, the database statistics may indicate a last update of a record in the database table, and the client copy log may identify a chronological order of previously executed copy operations; responsive to determining that the database table has changed, determining that the database table has been copied from a same source client of a last client copy operation; responsive to determining that the database table has been copied from the same source client of the last client copy operation, identify a record count in each of the source client and a target client; and responsive to determining that the record count of the source client is different from the record count of the target client, apply a delta copy algorithm. In addition, the delta copy algorithm may include: selecting records of the source client; deducting, from the records of the source client, records of the target client; inserting records that are in the source client and not in the target client; and deleting records that are in the target client and not in the source client.

In some variations, one or more of the features disclosed herein including the following features can optionally be included in any feasible combination. In some variations, the operations may further include: determining, based on the database statistics, that the database table of the source client is empty; and responsive to determining that the database table of the source client is empty, skipping a copy operation on the database table.

In some variations, the operations may further include: determining, based on the database statistics and the client copy log, that the database table is unchanged; and responsive to determining that the database table is unchanged, skipping a copy operation on the database table.

In some variations, the operations may further include: determining that the database table has not been copied from the same source client of the last client copy operation; deleting data of the target client; and after the deleting, copying data of the source client to the database table using an insert operation.

In some variations, the operations may further include: determining that the record count of the source client is the same as the record count of the target client; comparing an intersect of the record count of the source client and the record count of the target client, to the record count in each of the source client and the target client; determining, using the comparing, that data is different in the source client and the target client; and applying the delta copy algorithm, where only changed data records are deleted or copied.

In some variations, the operations may further include: determining that the record count of the source client is the same as the record count of the target client; comparing an intersect of the record count of the source client and the record count of the target client, to the record count in each of the source client and the target client; determining, using the comparing, that data is the same in the source client and the target client; and skipping a copy operation on the database table.

In some variations, the client copy log may further identify the source client and the target client of each copy operation.

In another aspect, there is provided a computer program product that includes a non-transitory computer readable medium. The non-transitory computer readable medium may store instructions that cause operations when executed by at least one data processor. The operations may include: determining, based on database statistics, that a database table of a source client is populated, the database statistics may include statistical data collected for the database table; responsive to determining that the database table of the source client is populated, determining, based on the database statistics and a client copy log, that the database table has changed, the database statistics may indicate a last update of a record in the database table, and the client copy log may identify a chronological order of previously executed copy operations; responsive to determining that the database table has changed, determining that the database table has been copied from a same source client of a last client copy operation; responsive to determining that the database table has been copied from the same source client of the last client copy operation, identify a record count in each of the source client and a target client; and responsive to determining that the record count of the source client is different from the record count of the target client, apply a delta copy algorithm. In addition, the delta copy algorithm may include: selecting records of the source client; deducting, from the records of the source client, records of the target client; inserting records that are in the source client and not in the target client; and deleting records that are in the target client and not in the source client.

In some variations, one or more of the features disclosed herein including the following features can optionally be included in any feasible combination. In some variations, the non-transitory computer readable medium may store instructions that that cause operations further including: determining, based on the database statistics, that the database table of the source client is empty; and responsive to determining that the database table of the source client is empty, skipping a copy operation on the database table.

In some variations, the non-transitory computer readable medium may store instructions that that cause operations further including: determining, based on the database statistics and the client copy log, that the database table is unchanged; and responsive to determining that the database table is unchanged, skipping a copy operation on the database table.

In some variations, the non-transitory computer readable medium may store instructions that that cause operations further including: determining that the database table has not been copied from the same source client of the last client copy operation; deleting data of the target client; and after the deleting, copying data of the source client to the database table using an insert operation.

In some variations, the non-transitory computer readable medium may store instructions that that cause operations further including: determining that the record count of the source client is the same as the record count of the target client; comparing an intersect of the record count of the source client and the record count of the target client, to the record count in each of the source client and the target client; determining, using the comparing, that data is different in the source client and the target client; and applying the delta copy algorithm, where only changed data records are deleted or copied.

In some variations, the non-transitory computer readable medium may store instructions that that cause operations further including: determining that the record count of the source client is the same as the record count of the target client; comparing an intersect of the record count of the source client and the record count of the target client, to the record count in each of the source client and the target client; determining, using the comparing, that data is the same in the source client and the target client; and skipping a copy operation on the database table.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Aspects of the disclosure provide a technical solution that addresses problems associated with the selection of an optimal client copy strategy for a client copy process. To optimize the client copy process, aspects of the disclosure may flexibly decide which copy strategy should be used for each table. Further aspects of the disclosure provide for dynamic selection of delta client copy strategies. These and various other arrangements will be discussed more fully below.

Figure 1:
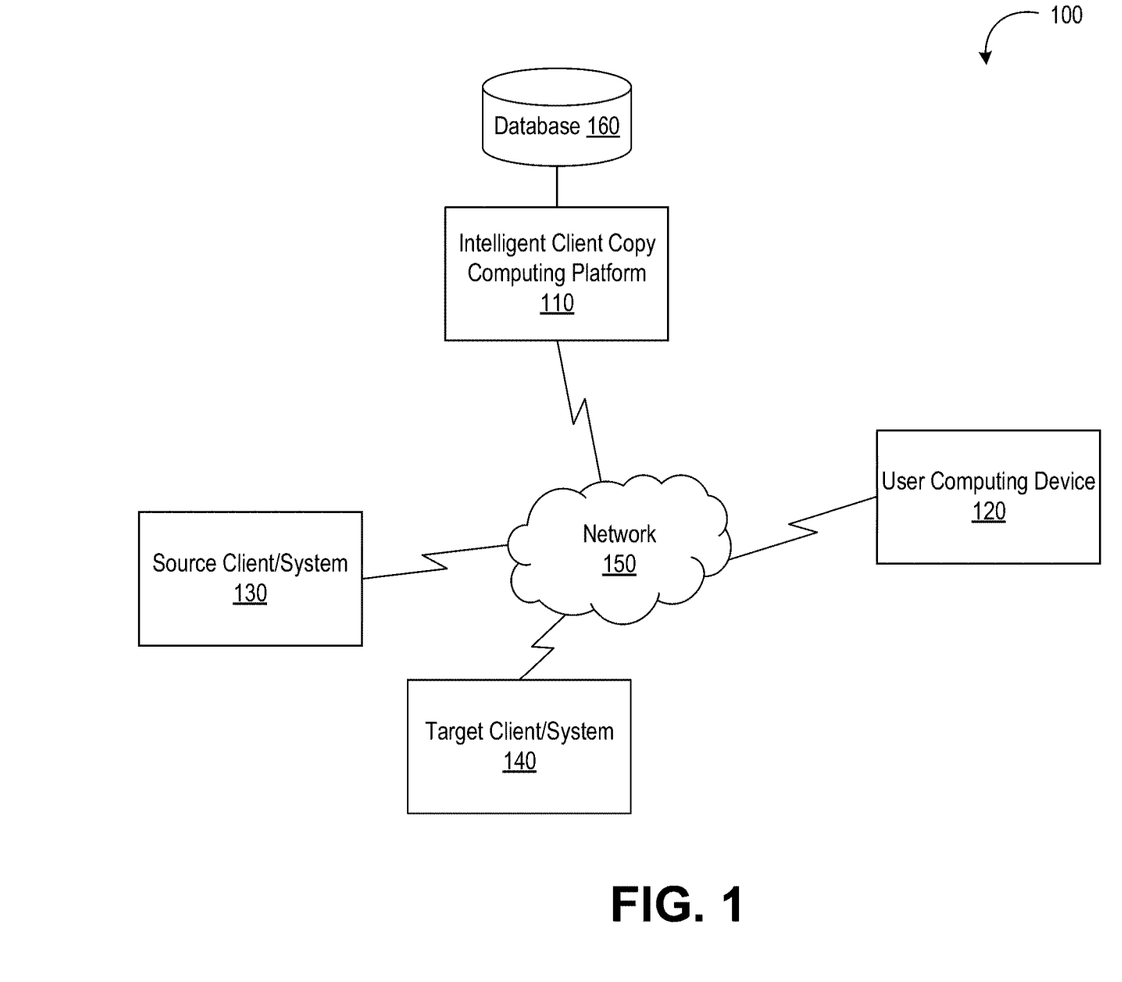
FIG. 1 depicts an illustrative computing environment for dynamic selection of delta client copy strategies in accordance with some example embodiments.

FIG. 1 depicts an illustrative computing environment 100 for intelligent client copying in accordance with some example embodiments. Referring to FIG. 1, the computing environment 100 may include one or more computing devices and/or other computing systems. For example, computing environment 100 may include an intelligent client copy computing platform 110, a user computing device 120, a source client 130 (or system), a target client 140 (or system), and a database 160. Intelligent client copy computing platform 110 may include one or more computing devices configured to perform one or more of the functions described herein. Intelligent client copy computing platform 110 may replicate (e.g., copy) the data of one client (e.g., source client 130) in another client (e.g., target client 140). User computing device 120 may be a processor-based device including, for example, a smartphone, a tablet computer, a wearable apparatus, a virtual assistant, an Internet-of-Things (IoT) appliance, and/or the like. Database 160 may include, for example, a relational database, an in-memory database, a graph database, a key-value store, a document store, and/or the like. In some examples, the intelligent client copy computing platform 110 may maintain (e.g., store) various types of data, including static and nonstatic data (e.g., system data, customizing data, master data, application data, log data, and/or the like) in one or more database tables at a database 160 coupled with the intelligent client copy computing platform 110.

Referring again to FIG. 1, the intelligent client copy computing platform 110, the user computing device 120, the source client 130 (or system), the target client 140 (or system), and the database 160 may be communicatively coupled via a network 150. The network 150 may be a wired and/or wireless network including, for example, a wide area network (WAN), local area network (LAN), a virtual local area network (VLAN), the Internet, and/or the like. Meanwhile, the source client 130 and/or the target client 140 may be cloud-based systems hosted on one or more cloud-computing platforms.

Figure 2:
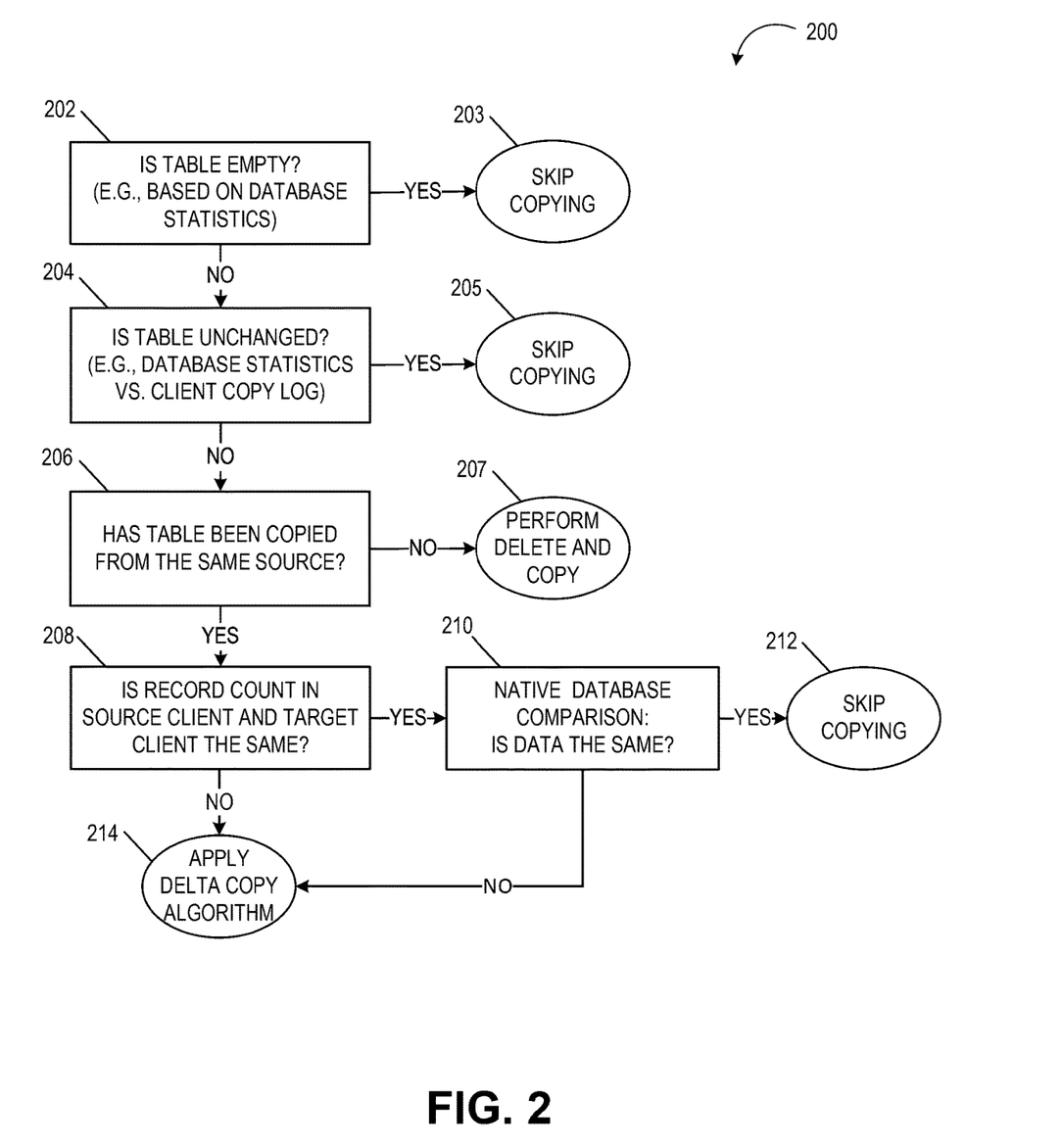
FIG. 2 depicts a flowchart illustrating a process for dynamic selection of delta client copy strategies in accordance with some example embodiments.

FIG. 2 depicts a flowchart illustrating a process 200 for dynamic selection of delta client copy strategies, in accordance with some example embodiments. Referring to FIG. 2, at step 202, intelligent client copy computing platform 110 may determine whether a database table of a source client is empty (e.g., based on database statistics). Database statistics may include statistical data collected for a database table having information such as the number of rows in the table, the number of distinct values that occur in a column, and/or the like.

Responsive to determining that the database table of the source client is empty (e.g., 202:YES), intelligent client copy computing platform 110 may, at step 203, skip a copy operation on the database table. For example, if a number of records in a client is zero (e.g., table is empty), intelligent client copy computing platform 110 may exclude that table from the client copy process, keeping the processing time at a minimum.

Responsive to determining that the database table of the source client is populated (not empty) (e.g., 202 NO), intelligent client copy computing platform 110 may determine, at step 204, whether the database table is unchanged (e.g., based on the database statistics and a client copy log). In some examples, the database statistics may indicate a last update of a record in the database table, and the client copy log may identify a chronological order of previously executed copy operations. In addition, the client copy log may further identify the source client and the target client of each copy operation. For example, intelligent client copy computing platform 110 may determine whether the database table is unchanged by comparing the database statistics indicating when a last update was performed and the client copy log indicating the latest execution of the client copy.

Figure 3A:
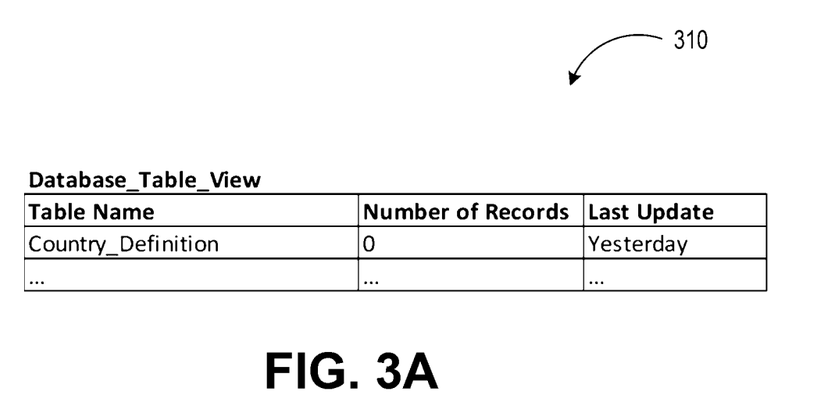
FIGS. 3A and 3B depict example database tables operated upon by an intelligent client copy tool in accordance with some example embodiments.
Figure 3B:
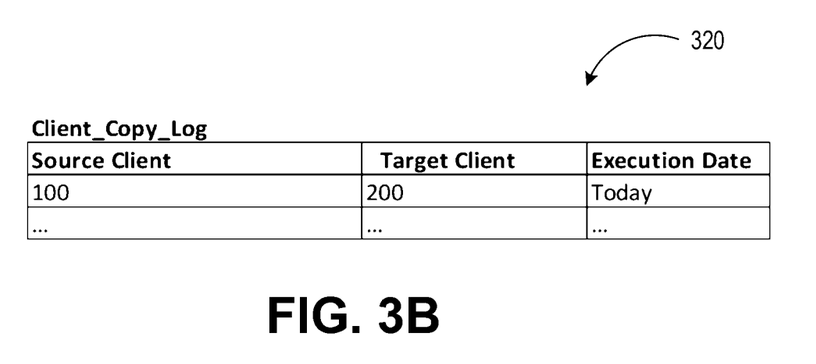

FIGS. 3A and 3B depict example database tables operated upon by an intelligent client copy tool in accordance with some example embodiments. Referring to FIG. 3A, in a database table view 310, a "Number of Records" column may indicate a number of records in a database table and a "Last Update" column may indicate when a last update/last client copy was performed. Referring to FIG. 3B, in a client copy log 320, an "Execution Date" column may indicate a latest execution of the client copy. It will be appreciated that other and/or different statistics or information related to the client copy process may also be provided.

Returning to FIG. 2, at step 205, responsive to determining that the database table is unchanged (e.g., 204:YES) intelligent client copy computing platform 110 may skip a copy operation on the database table. For example, if the database table view 310 indicates that the "last update" on the table was "last year," then intelligent client copy computing platform 110 may skip performing a copy operation on that table. On the other hand, if the database table view 310 indicates that the "last update" on the table was "yesterday," and the client copy log 320 indicates that last client copy was "today," intelligent client copy computing platform 110 may determine that there was a change on the table.

Responsive to determining that the database table has changed (is not unchanged) (e.g., 204:NO), intelligent client copy computing platform 110 may, at step 206, determine whether the database table has been copied from a same source client of a last client copy operation. In some examples, tables that were already copied with the same source and target client during the last client copy operation are copied directly to the database using a delta copy algorithm when the client copy is repeated.

Responsive to determining that the database table has not been copied from the same source client of the last client copy operation (e.g., 206:NO), intelligent client copy computing platform 110 may, at step 207, delete data of the target client and copy data of the source client to the database table using an insert operation (e.g., INSERT INTO <Target Client> FROM (SELECT * FROM <Source Client>)). Similarly, for tables whose data origin and/or status in the source and target client is not clear, intelligent client copy computing platform 110 may first carry out a complete deletion of the data in the target client, and then copy the data of the source client directly to the database using an insert operation (e.g., INSERT INTO <Target Client> FROM (SELECT * FROM <Source Client>).

Responsive to determining that the database table has been copied from the same source client of the last client copy operation (e.g., 206:YES), intelligent client copy computing platform 110 may, at step 208, identify a record count in each of the source client and the target client.

Responsive to determining that the record count of the source client is different from (e.g., not the same as) the record count of the target client (e.g., 208:NO), intelligent client copy computing platform 110 may, at step 214, apply a delta copy algorithm. The delta copy algorithm may select records of the source client and deduct, from the records of the source client, records of the target client, (e.g., returning records that are in the source client but not in the target client). Then, the delta copy algorithm may insert the records that are in the source client but not in the target client, and delete records that are in the target client but not in the source client. The following is an example SQL query for the delta copy algorithm:
    SELECT client100 EXCEPT (SELECT client200)
    INSERT (SELECT client100 EXCEPT (SELECT client200))
    DELETE (SELECT client200 EXCEPT (SELECT client100))

An INTERSECT parameter returns a result set of a select statement for common data of two or more queries. An EXCEPT parameter returns a result set based on two select statements in which the rows from the first select statement that are not available in the second select statement, are returned (all the rows from the second query are subtracted/deducted from the first query.

Responsive to determining that the record count of the source client is the same as the record count of the target client (e.g., 208:YES), intelligent client copy computing platform 110 may, at step 210, compare the data directly in the native database between the source and target client using an SQL statement, and only the changed data records are deleted or copied. For example, intelligent client copy computing platform 110 may compare an intersect of the record count of the source client and the record count of the target client, to the record count in each of the source client and the target client (e.g., to determine whether the data is the same in both the source client and the target client). The following is an example SQL query for the comparing step:
    SELECT count(*) FROM client100
    SELECT count(*) FROM client200
    SELECT count(*) FROM (SELECT data FROM client100 INTERSECT SELECT data FROM client200)

SQL SELECT count may be used to retrieve matching records. SQL INTERSECT may be used to return the records that exist in both "client100" and "client200." If the count for "client100" is equal to the count for "client200," and the intersect count is equal to the count in "client100" and/or the count in "client200," then the data of both clients are determined to be the same.

Based the comparing (e.g., at step 210), intelligent client copy computing platform 110 may determine that data in the source client and the target client is different (e.g., not the same, 210:NO). Then, at step 214, intelligent client copy computing platform 110 may apply the delta copy algorithm discussed above, and only changed data records are deleted or copied.

Alternatively, intelligent client copy computing platform 110 may determine, using the comparing (e.g., at step 210), that data in the source client and the target client is the same (e.g., 210:YES) and skip a copy operation on the database table. For example, tables that have already been copied once and have the same record count in the source and target clients (e.g., 208:YES) are compared in advance using a native database procedure (e.g., at 210). For these tables, the probability that they are identical is rather high. Therefore, the data is compared beforehand to determine whether the delta copy algorithm (e.g., at step 214) should be applied or not (e.g., saving runtime in calculating the delta copy algorithm when the copy operation is skipped, for example, at step 212).

Advantageously, among other things, the intelligent client copy computing platform 110 may flexibly decide, for each table, which copy strategy should be used.

Figure 4:
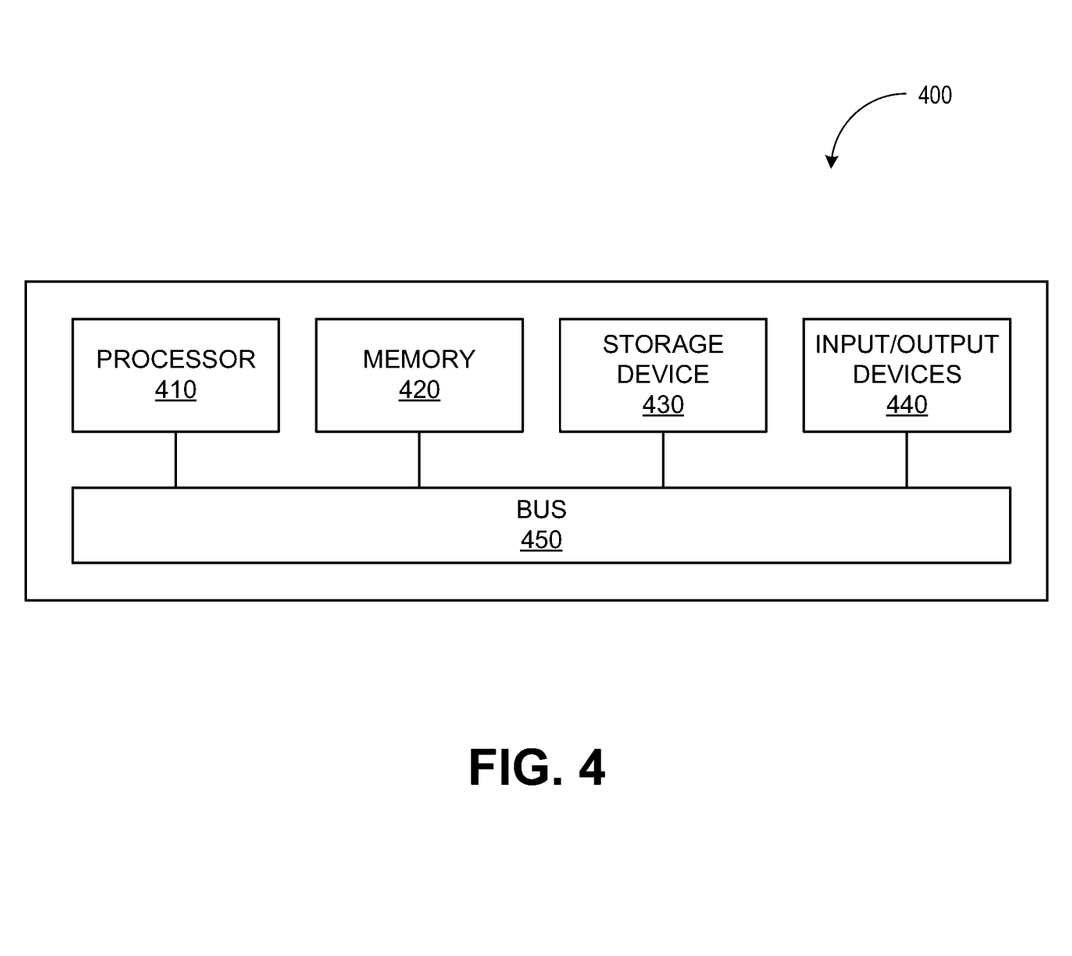
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the intelligent client copy computing platform 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the intelligent client copy computing platform 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
at least one data processor; and
at least one memory storing instructions, which when executed by the at least one data processor, result in operations comprising:
determining, based on database statistics, that a database table of a source client is populated, wherein the database statistics includes statistical data collected for the database table;

responsive to determining that the database table of the source client is populated, determining, based on the database statistics and a client copy log, that the database table has changed, wherein the database statistics indicate a last update of a record in the database table, and wherein the client copy log which identifies a chronological order of previously executed copy operations;

responsive to determining that the database table has changed, determining that the database table has been copied from a same source client of a last client copy operation;

responsive to determining that the database table has been copied from the same source client of the last client copy operation, identify a record count in each of the source client and a target client; and responsive to determining that the record count of the source client is different from the record count of the target client, apply a delta copy algorithm, wherein the delta copy algorithm comprises:
  selecting records of the source client;
  deducting, from the records of the source client, records of the target client;
  inserting records that are in the source client and not in the target client; and
  deleting records that are in the target client and not in the source client.

Example 2: The system of Example 1, further comprising: determining, based on the database statistics, that the database table of the source client is empty; and responsive to determining that the database table of the source client is empty, skipping a copy operation on the database table.

Example 3: The system of any of Examples 1-2, further comprising: determining, based on the database statistics and the client copy log, that the database table is unchanged; and responsive to determining that the database table is unchanged, skipping a copy operation on the database table.

Example 4: The system of any of Examples 1-3, further comprising: determining that the database table has not been copied from the same source client of the last client copy operation; deleting data of the target client; and after the deleting, copying data of the source client to the database table using an insert operation.

Example 5: The system of any of Examples 1-4, further comprising: determining that the record count of the source client is the same as the record count of the target client; comparing an intersect of the record count of the source client and the record count of the target client, to the record count in each of the source client and the target client; determining, using the comparing, that data is different in the source client and the target client; and applying the delta copy algorithm, wherein only changed data records are deleted or copied.

Example 6: The system of any of Examples 1-5, further comprising: determining that the record count of the source client is the same as the record count of the target client; comparing an intersect of the record count of the source client and the record count of the target client, to the record count in each of the source client and the target client; determining, using the comparing, that data is the same in the source client and the target client; and skipping a copy operation on the database table.

Example 7: The system of any of Examples 1-6, wherein the client copy log further identifies the source client and the target client of each copy operation.

Example 8: A computer-implemented method, comprising: determining, based on database statistics, that a database table of a source client is populated, wherein the database statistics includes statistical data collected for the database table; responsive to determining that the database table of the source client is populated, determining, based on the database statistics and a client copy log, that the database table has changed, wherein the database statistics indicate a last update of a record in the database table, and wherein the client copy log which identifies a chronological order of previously executed copy operations; responsive to determining that the database table has changed, determining that the database table has been copied from a same source client of a last client copy operation; responsive to determining that the database table has been copied from the same source client of the last client copy operation, identify a record count in each of the source client and a target client; and responsive to determining that the record count of the source client is different from the record count of the target client, apply a delta copy algorithm, wherein the delta copy algorithm comprises: selecting records of the source client; deducting, from the records of the source client, records of the target client; inserting records that are in the source client and not in the target client; and deleting records that are in the target client and not in the source client.

Example 9: The computer-implemented method of Example 8, further comprising: determining, based on the database statistics, that the database table of the source client is empty; and responsive to determining that the database table of the source client is empty, skipping a copy operation on the database table.

Example 10: The computer-implemented method of Example 9, further comprising: determining, based on the database statistics and the client copy log, that the database table is unchanged; and responsive to determining that the database table is unchanged, skipping a copy operation on the database table.

Example 11: The computer-implemented method of any of Examples 9-10, further comprising: determining that the database table has not been copied from the same source client of the last client copy operation; deleting data of the target client; and after the deleting, copying data of the source client to the database table using an insert operation.

Example 12: The computer-implemented method of any of Examples 9-11, further comprising: determining that the record count of the source client is the same as the record count of the target client; comparing an intersect of the record count of the source client and the record count of the target client, to the record count in each of the source client and the target client; determining, using the comparing, that data is different in the source client and the target client; and applying the delta copy algorithm, wherein only changed data records are deleted or copied.

Example 13: The computer-implemented method of any of Examples 9-12, further comprising: determining that the record count of the source client is the same as the record count of the target client; comparing an intersect of the record count of the source client and the record count of the target client, to the record count in each of the source client and the target client; determining, using the comparing, that data is the same in the source client and the target client; and skipping a copy operation on the database table.

Example 14: The computer-implemented method of any of Examples 9-13, wherein the client copy log further identifies the source client and the target client of each copy operation.

Example 15: A non-transitory computer readable medium storing instructions, which when executed by at least one data processor, result in operations comprising:

determining, based on database statistics, that a database table of a source client is populated, wherein the database statistics includes statistical data collected for the database table;

responsive to determining that the database table of the source client is populated, determining, based on the database statistics and a client copy log, that the database table has changed, wherein the database statistics indicate a last update of a record in the database table, and wherein the client copy log which identifies a chronological order of previously executed copy operations;

responsive to determining that the database table has changed, determining that the database table has been copied from a same source client of a last client copy operation;

responsive to determining that the database table has been copied from the same source client of the last client copy operation, identify a record count in each of the source client and a target client; and responsive to determining that the record count of the source client is different from the record count of the target client, apply a delta copy algorithm, wherein the delta copy algorithm comprises:
 selecting records of the source client;
 deducting, from the records of the source client, records of the target client;
 inserting records that are in the source client and not in the target client; and
 deleting records that are in the target client and not in the source client.

Example 16: The non-transitory computer readable medium of Example 15, wherein the instructions, when executed by the at least one data processor, further result in operations comprising: determining, based on the database statistics, that the database table of the source client is empty; and responsive to determining that the database table of the source client is empty, skipping a copy operation on the database table.

Example 17: The non-transitory computer readable medium of any of Examples 15-16, wherein the instructions, when executed by the at least one data processor, further result in operations comprising: determining, based on the database statistics and the client copy log, that the database table is unchanged; and responsive to determining that the database table is unchanged, skipping a copy operation on the database table.

Example 18: The non-transitory computer readable medium of any of Examples 15-17, wherein the instructions, when executed by the at least one data processor, further result in operations comprising: determining that the database table has not been copied from the same source client of the last client copy operation; deleting data of the target client; and after the deleting, copying data of the source client to the database table using an insert operation.

Example 19: The non-transitory computer readable medium of any of Examples 15-18, wherein the instructions, when executed by the at least one data processor, further result in operations comprising: determining that the record count of the source client is the same as the record count of the target client; comparing an intersect of the record count of the source client and the record count of the target client, to the record count in each of the source client and the target client; determining, using the comparing, that data is different in the source client and the target client; and applying the delta copy algorithm, wherein only changed data records are deleted or copied.

Example 20: The non-transitory computer readable medium of any of Examples 15-19, wherein the instructions, when executed by the at least one data processor, further result in operations comprising: determining that the record count of the source client is the same as the record count of the target client; comparing an intersect of the record count of the source client and the record count of the target client, to the record count in each of the source client and the target client; determining, using the comparing, that data is the same in the source client and the target client; and skipping a copy operation on the database table.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
 at least one data processor; and
 at least one memory storing instructions, which when executed by the at least one data processor, result in operations comprising:
  determining, based on database statistics, whether a database table of a source client is populated, wherein the database statistics includes statistical data collected for the database table;
  responsive to determining that the database table of the source client is populated, determining, based on the database statistics and a client copy log, that the database table has changed, wherein the database statistics indicate a last update of a record in the database table, and wherein the client copy log which identifies a chronological order of previously executed copy operations;
  responsive to determining that the database table of the source client is not populated, skipping a copy operation on the database table;
  determining, based on the database statistics and the client copy log, whether the database table is unchanged;
  responsive to determining that the database table is unchanged, skipping a copy operation on the database table;
  responsive to determining that the database table has changed, determining whether the database table has been copied from a same source client of a last client copy operation, wherein in response to the database table not being copied from the same source client of the last client copy operation, a delete and copy operation is performed to delete data of a target client and then copying data of the source client to the database table of the target client using an insert operation;

responsive to determining that the database table has been copied from the same source client of the last client copy operation, identify a record count in each of the source client and the target client;

responsive to determining that the record count of the source client is different from the record count of the target client, apply a delta copy algorithm; and responsive to determining that the record count of the source client is the same to the record count of the target client, applying the delta copy algorithm, when the data is different in the source client and the target client, and skipping the delta copy algorithm, when the data is the same.

2. The system of claim 1, further comprising:
determining that the record count of the source client is the same as the record count of the target client;
comparing an intersect of the record count of the source client and the record count of the target client, to the record count in each of the source client and the target client; and
determining, using the comparing, that data is different in the source client and the target client.

3. The system of claim 1, further comprising:
determining that the record count of the source client is the same as the record count of the target client;
comparing an intersect of the record count of the source client and the record count of the target client, to the record count in each of the source client and the target client; and
determining, using the comparing, that data is the same in the source client and the target client.

4. The system of claim 1, wherein the client copy log further identifies the source client and the target client of each copy operation.

5. The system of claim 1, wherein the delta copy algorithm comprises:
selecting records of the source client;
deducting, from the records of the source client, records of the target client;
inserting records that are in the source client and not in the target client; and
deleting records that are in the target client and not in the source client.

6. A computer-implemented method, comprising:
determining, based on database statistics, whether a database table of a source client is populated, wherein the database statistics includes statistical data collected for the database table;
responsive to determining that the database table of the source client is populated, determining, based on the database statistics and a client copy log, that the database table has changed, wherein the database statistics indicate a last update of a record in the database table, and wherein the client copy log which identifies a chronological order of previously executed copy operations;
responsive to determining that the database table of the source client is not populated, skipping a copy operation on the database table;
determining, based on the database statistics and the client copy log, whether the database table is unchanged;

responsive to determining that the database table is unchanged, skipping a copy operation on the database table;

responsive to determining that the database table has changed, determining whether the database table has been copied from a same source client of a last client copy operation, wherein in response to the database table not being copied from the same source client of the last client copy operation, a delete and copy operation is performed to delete data of a target client and then copying data of the source client to the database table of the target client using an insert operation;

responsive to determining that the database table has been copied from the same source client of the last client copy operation, identify a record count in each of the source client and the target client;

responsive to determining that the record count of the source client is different from the record count of the target client, apply a delta copy algorithm; and responsive to determining that the record count of the source client is the same to the record count of the target client, applying the delta copy algorithm, when the data is different in the source client and the target client, and skipping the delta copy algorithm, when the data is the same.

7. The computer-implemented method of claim 6, further comprising:
determining that the record count of the source client is the same as the record count of the target client;
comparing an intersect of the record count of the source client and the record count of the target client, to the record count in each of the source client and the target client; and
determining, using the comparing, that data is different in the source client and the target client.

8. The computer-implemented method of claim 6, further comprising:
determining that the record count of the source client is the same as the record count of the target client;
comparing an intersect of the record count of the source client and the record count of the target client, to the record count in each of the source client and the target client; and
determining, using the comparing, that data is the same in the source client and the target client.

9. The computer-implemented method of claim 6, wherein the client copy log further identifies the source client and the target client of each copy operation.

10. A non-transitory computer readable medium storing instructions, which when executed by at least one data processor, result in operations comprising:
determining, based on database statistics, whether a database table of a source client is populated, wherein the database statistics includes statistical data collected for the database table;
responsive to determining that the database table of the source client is populated, determining, based on the database statistics and a client copy log, that the database table has changed, wherein the database statistics indicate a last update of a record in the database table, and wherein the client copy log which identifies a chronological order of previously executed copy operations;
responsive to determining that the database table of the source client is not populated, skipping a copy operation on the database table;

determining, based on the database statistics and the client copy log, whether the database table is unchanged;

responsive to determining that the database table is unchanged, skipping a copy operation on the database table;

responsive to determining that the database table has changed, determining whether the database table has been copied from a same source client of a last client copy operation, wherein in response to the database table not being copied from the same source client of the last client copy operation, a delete and copy operation is performed to delete data of a target client and then copying data of the source client to the database table of the target client using an insert operation;

responsive to determining that the database table has been copied from the same source client of the last client copy operation, identify a record count in each of the source client and the target client;

responsive to determining that the record count of the source client is different from the record count of the target client, apply a delta copy algorithm; and responsive to determining that the record count of the source client is the same to the record count of the target client, applying the delta copy algorithm, when the data is different in the source client and the target client, and skipping the delta copy algorithm, when the data is the same.

11. The non-transitory computer readable medium of claim 10, wherein the instructions, when executed by the at least one data processor, further result in operations comprising:

determining that the record count of the source client is the same as the record count of the target client;

comparing an intersect of the record count of the source client and the record count of the target client, to the record count in each of the source client and the target client; and determining, using the comparing, that data is different in the source client and the target client.

12. The non-transitory computer readable medium of claim 10, wherein the instructions, when executed by the at least one data processor, further result in operations comprising:

determining that the record count of the source client is the same as the record count of the target client;

comparing an intersect of the record count of the source client and the record count of the target client, to the record count in each of the source client and the target client; and determining, using the comparing, that data is the same in the source client and the target client.

* * * * *